Feb. 26, 1924.
F. P. MARX
1,485,234
SHANK STIFFENER
Filed Nov. 12, 1921      2 Sheets-Sheet 1
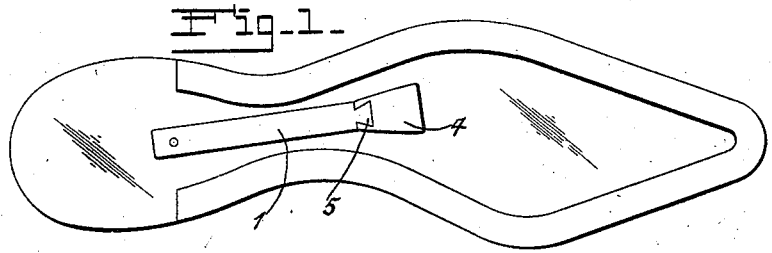
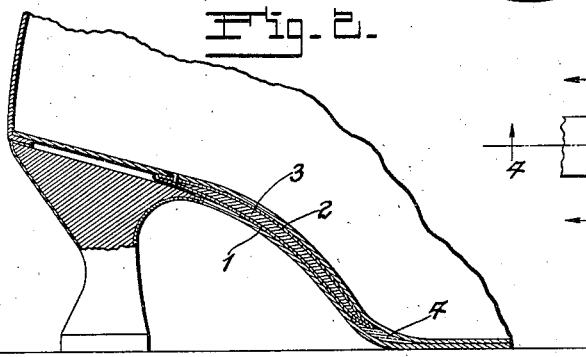
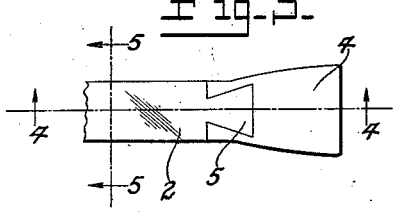
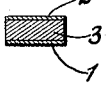
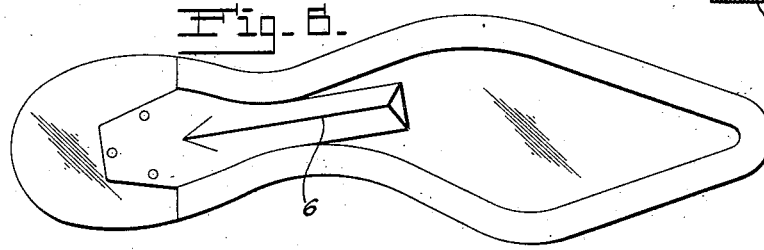
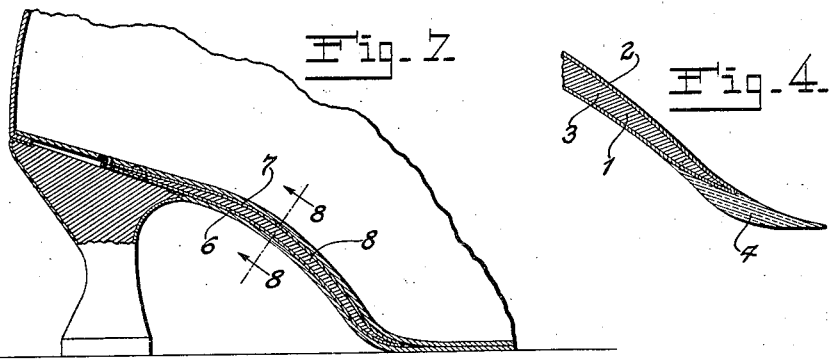
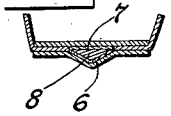
Inventor.
Frederick P. Marx,
by
His Attorneys.

Feb. 26, 1924.
F. P. MARX
SHANK STIFFENER
Filed Nov. 12, 1921
1,485,234
2 Sheets-Sheet 2
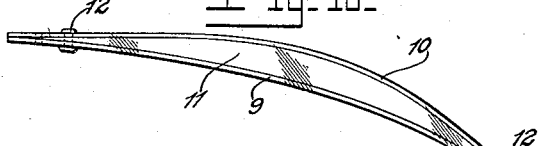
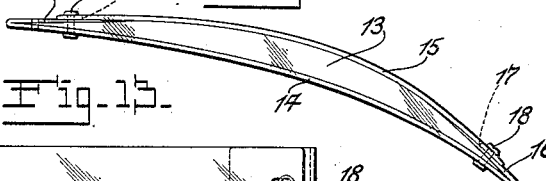
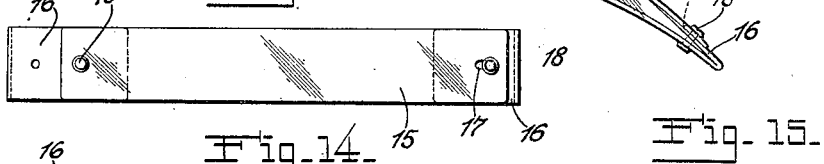
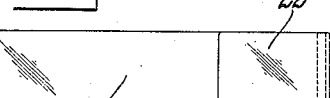
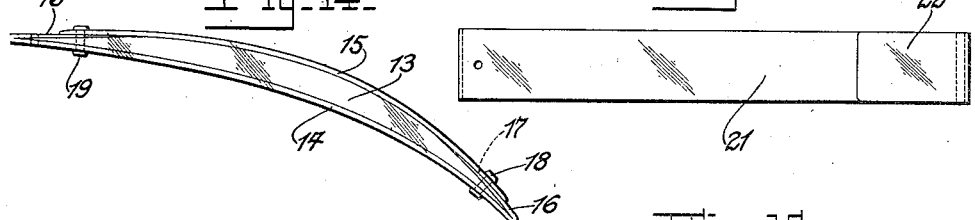
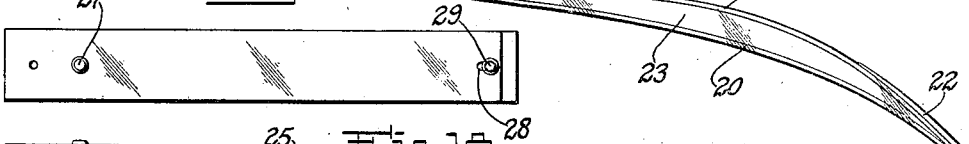
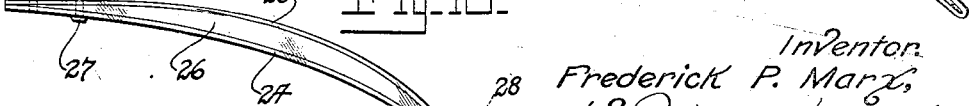
Inventor.
Frederick P. Marx,
by Pippey & Kingsland
His Attorneys.

Patented Feb. 26, 1924.

1,485,234

UNITED STATES PATENT OFFICE.

FREDERICK P. MARX, OF ST. LOUIS, MISSOURI.

SHANK STIFFENER.

Application filed November 12, 1921. Serial No. 514,624.

*To all whom it may concern:*

Be it known that I, FREDERICK P. MARX, a citizen of the United States, residing at the city of St. Louis and State of Missouri, have invented a new and useful Shank Stiffener, of which the following is a specification.

This invention relates to shank stiffeners for shoes.

An object of the invention is to provide a shank stiffener having superior qualities of strength and resiliency so that while the arch is properly supported there is sufficient resiliency to obtain the results for which the devices are provided.

Another object of the invention is to provide an improved shank stiffener including one or more metal plates in association with a non-metallic member.

Another object of the invention is to provide an improved shank stiffener comprising an arcuate lower plate separated from an arcuate upper plate by a non-metallic filler.

Other objects will appear from the following description, reference being made to the drawing in which—

Fig. 1 is a bottom plan view showing one form of my improved shank stiffener in connection with a shoe sole.

Fig. 2 is a longitudinal sectional view.

Fig. 3 is a detailed view showing appropriate connection or union between the forward end of the shank stiffener and the cushion or abutment.

Fig. 4 is a sectional view on the line 4—4 of Fig. 3.

Fig. 5 is a sectional view on the line 5—5 of Fig. 3.

Fig. 6 is a bottom plan view of a portion of the invention.

Fig. 7 is a longitudinal sectional view thereof.

Fig. 8 is a cross sectional view on the line 8—8 of Fig. 7.

Figs. 9 and 10 are top and side elevations of one form of the shank stiffener.

Figs. 11 and 12 are top and side elevations of another form of shank stiffener.

Figs. 13 and 14 are top and side elevations showing a variation from the other structures shown.

Figs. 15 and 16 show still another variation.

Figs. 17 and 18 are top and side elevations of another modification.

In the form of the invention shown in Figs. 1 to 5 inclusive the shank stiffener comprises a metallic plate folded to provide a lower member 1 and an upper member 2 both of which are arcuate in side elevation and the ends of which are in connection with each other. The portions 1 and 2 converge toward their ends and are separated by a filler 3 of wood or other appropriate non-metallic material of sufficient strength and flexibility to hold the two metallic portions of the arch support spaced apart, as shown, and to bend or yield therewith as conditions may require. A cushion or abutment 4 is secured to the forward end of the shank stiffener by an appropriate connection, the connection shown being a dovetail portion 5 at the end of the shank stiffener molded in the body of the cushion abutment. The cushion abutment is of pliable material such as rubber.

As shown in Figs. 1 and 2 the shank stiffener thus constructed curves in conformity with the desired curvature of the arch of the shoe for which it is intended. The shank stiffener is secured between the shoe welts with the rear end of the support above the shoe heel and fulcrumed on the breast wall of the heel. From that point the shank stiffener curves downwardly and forwardly and terminates just to the rear of the break line of the shoe. The break line of the shoe is crossed by the pliable abutment support 4 which forms a proper cushion at this point of the shoe sole, not only functioning to prevent the metallic shank stiffener from causing damage to the shoe sole but also serving to afford the desired elasticity and ease in walking.

The device shown in Figs. 6, 7 and 8 is similar to that above described to the extent that said last-named device comprises a lower metallic portion 6 and an upper metallic portion 7, both curved properly. These two metallic portions widen toward their rear ends as shown in Fig. 6, while the lower portion 6 may be V-shaped as shown in Fig. 8, having its side edges in contact with the upper portion 7. A non-metallic filler 8 is in the space between the upper and lower members 6 and 7.

In the application of the device as shown in Fig. 7 the cushion or abutment is omitted at the forward end. The forward end is near the break line of the shoe and is curved in the opposite direction from the curvature of the main portion thereof.

In the form of the shank stiffener shown in Figs. 9 and 10 the upper and lower plates are separated, the lower plate 9 having a longer radius of curvature than the upper plate 10, so that the ends of the latter approach close to the ends of the former leaving a substantially crescent-shaped space between them. Within the space between the plates 9 and 10 a non-metallic filler 11 is retained, said filler being characterized by sufficient flexibility to permit bending of the device. The ends of the two plates are attached by rivets or fasteners 12 passing therethrough and through the interposed portions of the filler 11 near the ends thereof.

In the form of the invention shown in Figs. 11 and 12 a non-metallic filler 13 is enclosed between the filler plate 14 and an upper plate 15. The ends 16 of the lower plate are bent and turned over said plate, forming attenuated or wedge-shaped spaces for the ends of the filler. The upper plate 15 rests upon the upper surface of the filler 13 and is provided with a short slot 17 near each end thereof through which rivets or fasteners 18 pass. The rivets 18 hold the parts together but permit resilient action thereof when it is desirable or necessary to make use of that quality. The slots 17 permit proper action of the two plates without resistance by the rivets 18. This is desirable on some occasions because when pressure is applied to the arch support with the tendency to spring the same, a sliding action is necessary.

The form of the invention shown in Figs. 13 and 14 is the same as that shown in Figs. 11 and 12, with the exception that the slot 17 at one end of the plate 13 is omitted, there being a rivet 19 passing through a hole in the upper plate 13 and in the other parts of the support, and preventing sliding movement of the two plates at that end. However, at the opposite end of the plate 13 a slot 17 is present receiving a rivet 18.

Figs. 15 and 16 show the metallic portion of the shank stiffener composed of a single piece of metal bent to provide a lower member 20, an upper member 21 and an overlapping portion 22 in connection with one end of the lower member folded back upon the end of the upper member. A non-metallic filler 23 is interposed between the upper and lower members of the shank stiffener.

In the form of the invention shown in Figs. 17 and 18 the lower metallic plate 24 is somewhat longer than the upper plate 25, said two plates and the interposed filler 26 being secured together near one end by a rivet 27. The opposite end of the plate 25 terminates short of the end of the plate 24 and is formed with a slot 28 receiving a rivet 29. As a result of this construction proper resiliency and elasticity is obtained. The slot construction is at the forward end of the shank stiffener, where the relative movements of the parts obtain best results.

From the foregoing it is clear that my invention obtains all of its intended objects and results. It is of efficient construction and may be economically manufactured and applied to use, and by using selections of the forms or variations shown the desired results may be obtained in any case. That is, the degree of resiliency or elasticity may be determined in advance and the proper shank stiffener to obtain that degree of resiliency or elasticity may be used. There may be other variations in the invention without departure from the nature and principle thereof, and I do not restrict myself to the exact forms shown, nor otherwise, except as set forth in the appended claims.

What I claim and desire to secure by Letters Patent, is:—

1. In a shoe, an arched shank stiffener located between the welts of the shoe and comprising an arched lower metallic strip and an arched upper metallic strip having its ends adjacent the ends of the lower strip and its intermediate portion arched away from the intermediate portion of the lower strip, and the rear portion of said strips extending a relatively considerable distance rearwardly beyond the breast wall of the shoe heel, a non-metallic filler having an arched central portion and wedge-shaped ends completely filling the space between said strips, and means for holding the filler in place between said strips.

2. In a shoe, a shank stiffener located between the welts of the shoe and comprising a curved lower metallic strip and an upper metallic strip having its ends curving downwardly toward the ends of the lower strip, and the rear portion of said strips extending a relatively considerable distance rearwardly beyond the breast wall of the shoe heel, a non-metallic filler completely filling the space between said strips, means for holding the filler in place between said strips, said stiffener curving downwardly and forwardly and terminating rearwardly from the break line of the shoe, and a non-metallic elastic cushion at the forward end of the stiffener extending across the break line of the shoe.

3. In a shoe, an arched shank stiffener located between the welts of the shoe and having its rear end relatively a considerable distance rearwardly from the breast wall of the shoe heel and said stiffener comprising a pair of arcuate metallic strips arranged one above the other, and the upper one of said strips curving on a different radius of curvature from the lower strip and forming an arch separated from the lower strip by a space having wedge-shaped ends, a non-metallic filler of about the same width as said strips and having attenuated ends and filling the space between said strips, and means for preventing said filler from becoming displaced laterally.

4. In a shoe, a shank stiffener located between the welts of the shoe and having its rear end a relatively considerable distance rearwardly from the breast wall of the shoe heel and said stiffener comprising a pair of arcuate metallic strips arranged one above the other, and the upper one of said strips forming an arch separated from the lower strip, a non-metallic filler having attenuated ends filling the space between said strips, means for preventing said filler from becoming displaced laterally, and an elastic cushion extending from the forward end of said shank stiffener across the break line of the shoe.

FREDERICK P. MARX.